United States Patent
Oh et al.

(10) Patent No.: US 8,745,740 B2
(45) Date of Patent: Jun. 3, 2014

(54) APPARATUS AND METHOD FOR DETECTING MALICIOUS SITES

(75) Inventors: Ju Hyun Oh, Seoul (KR); Chang Woo Lee, Seoul (KR); Chong Phil Park, Seoul (KR)

(73) Assignee: AHNLAB., Inc., Gyeonggi-Do (KR)

( * ) Notice: Subject to any disclaimer, the term of this patent is extended or adjusted under 35 U.S.C. 154(b) by 29 days.

(21) Appl. No.: 13/505,858

(22) PCT Filed: Nov. 1, 2010

(86) PCT No.: PCT/KR2010/007608
§ 371 (c)(1),
(2), (4) Date: May 3, 2012

(87) PCT Pub. No.: WO2011/055945
PCT Pub. Date: May 12, 2011

(65) Prior Publication Data
US 2012/0233692 A1 Sep. 13, 2012

(30) Foreign Application Priority Data

Nov. 3, 2009 (KR) .......................... 10-2009-0105344

(51) Int. Cl.
*H04L 29/06* (2006.01)
*G06F 21/00* (2013.01)
*G06F 21/52* (2013.01)

(52) U.S. Cl.
CPC .............. *H04L 63/168* (2013.01); *G06F 21/52* (2013.01); *H04L 63/1441* (2013.01)
USPC ................................... 726/22; 726/7; 726/17

(58) Field of Classification Search
USPC ................................. 726/22, 7, 17
See application file for complete search history.

(56) References Cited

U.S. PATENT DOCUMENTS 7,716,686 B1 * 5/2010 Dalcher et al. ................ 719/328
(Continued)

FOREIGN PATENT DOCUMENTS

| JP | 2003337797 | 11/2003 |
| KR | 1020040098902 | 11/2004 |
| KR | 1020040104112 | 12/2004 |
| KR | 1020080043201 | 5/2008 |

(Continued)

OTHER PUBLICATIONS

Jansen, W.A.; "Cloud Hooks: Security and Privacy Issues in Cloud Computing"; System Sciences (HICSS), 2011 44th Hawaii International Conference on Digital Object Identifier: 10.1109/HICSS.2011.103; Publication Year: Jan. 2011; pp. 1-10.*

*Primary Examiner* — Andrew Nalven
*Assistant Examiner* — Courtney Fields
(74) *Attorney, Agent, or Firm* — Bacon & Thomas, PLLC

(57) ABSTRACT

The invention relates to an apparatus for detecting malicious sites, comprising: a monitoring unit for monitoring all processes being executed in a computing apparatus; a hook code insertion unit for inserting a hook code in a process executed in a browser when the execution of the browser is detected by the monitoring unit; a danger level determining unit that, upon the detection of a website movement, uses the hook code to inspect a stack structure of a process implemented according to the website movement and determine whether or not to perform the stack structure inspection, and determines whether or not the website to which the movement has been made is a malicious site; and a database for storing a list of sites determined to be malicious.

9 Claims, 2 Drawing Sheets

(56) References Cited

U.S. PATENT DOCUMENTS

| | | |
|---|---|---|
| 2008/0115219 A1 | 5/2008 | Kim et al. |
| 2009/0094585 A1 | 4/2009 | Choi et al. |
| 2009/0222907 A1* | 9/2009 | Guichard ........................ 726/17 |
| 2010/0005528 A1* | 1/2010 | Teller et al. .................... 726/22 |

FOREIGN PATENT DOCUMENTS

| | | |
|---|---|---|
| KR | 1020090034648 | 4/2009 |
| KR | 1020090096823 | 9/2009 |
| KR | 1020090111416 | 10/2009 |
| WO | WO 2007061671 A3 * | 5/2009 |

* cited by examiner

APPARATUS AND METHOD FOR DETECTING MALICIOUS SITES

TECHNICAL FIELD

The present invention relates to a technology for detecting malicious programs in computers and user devices, and more particularly, to a malicious site detection apparatus and method for determining the presence or absence of a malicious site when a process is executed by a browser for a computer or user device.

BACKGROUND OF THE INVENTION

In general, newly created malicious programs and malicious codes that have not yet been analyzed by vaccine developers or related security companies infect a computing apparatus concerned even if a vaccine program is installed in the computing apparatus. Especially, the computing apparatus may be infected with a malicious code (e.g., vulnerability attack (Exploit) code) merely by visiting a specific website when a user is connected to the Internet through the computing apparatus.

This means that an attacker hacks the website concerned and spreads a malicious code to people who visited the website, or that an attacker directly operates the website and spreads the malicious code.

In addition, an attacker can automatically collect web pages which are the target of attack through a search engine, and use an automated SQL injection attack tool for actual attacks. Recently used SQL injection attacks hides a malicious code link in a specific website and causes visitors to be infected. The SQL injection attack tool searches a vulnerable site through a search engine, and then performs an actual SQL injection attack on the vulnerable site to embed a script that links malicious script files to a DB.

When a user visits a website with a malicious script, contents which is accompanied by the embedded script is fetched from the DB by an attacker's web server and is presented to the user. Once the script is executed through a web browser, another malicious script is successively fetched from the attacker's web server and executed through the web browser. It is because that the malicious script is loaded with a vulnerability attack code (Exploit code) for actually attacking the user's computing apparatus. As a result, a malicious code is installed in the user's computing apparatus with a low security level so that important information leaks out from the user's computing apparatus.

In order to defend against such SQL injection attacks, much research is being done to find methods for blocking the incoming path of malicious codes by real-time inspection of websites and investigation on harmfulness.

In a related art of determining the presence of any malicious web page in a specific site, it is inspected only as to whether any malicious pattern exists in a script, or whether a page structure of a visited site is similar to a malicious web page. This may lead to the problem that a specific malicious pattern cannot be found, or previously unknown, new malicious programs may not be detected even by inspection. The related art is disclosed in Korean Patent Laid-Open Publication No. 2009-0034648 (Published on Apr. 8, 2009).

DISCLOSURE

Technical Problem

In view of the above, the present invention provides a malicious site detection apparatus and method for determining the presence or absence of a malicious site by focusing on the differences of a normal process execution and a process execution for a program downloaded from a malicious site.

Further, the present invention provides a malicious site detection apparatus and method for determining whether a currently visited site is a malicious site or whether a process currently executed by a computer is abnormal by checking the presence or absence of a certificate in the corresponding process or the normality or abnormality of a stack structure of a process at the time of execution of the process of a program downloaded from the visited site.

Technical Solution

In accordance with an aspect of the present invention, there is an apparatus for detecting malicious sites, which includes: a monitoring unit configured to monitor a process executed in a computing apparatus; a danger level determining unit, when a browser is executed in the computing apparatus, configured to insert a hook code into the process, inspect a stack structure of the process, determine whether or not the stack structure inspection has been done, and determine whether or not the website is a malicious site; and a database for storing the website determined to be malicious in a malicious site list.

In accordance with another aspect of the present invention, there is provided a method for detecting malicious sites, which includes: monitoring a process executed in a computing apparatus; upon detection of execution of a browser in a computing apparatus, inserting a hook code into the process; inspecting a stack structure of the process; checking whether or not the stack structure inspection has been made; and determining whether or not the website is a malicious site; and storing the website determined as the malicious site in a database.

Advantageous Effects

According to the apparatus and method for detecting malicious sites in accordance with an embodiment of the present invention, quick analysis and cure may be enabled by detecting a script pattern and malicious files actually executed by a browser, and new malicious files that are not widely known yet may be detected, thereby making it possible to easily identify the malicious sites.

BEST MODE FOR THE INVENTION

Hereinafter, embodiments of the present invention will be described in detail with reference to the accompanying drawings which constitute part of this specification.

Figure 1:
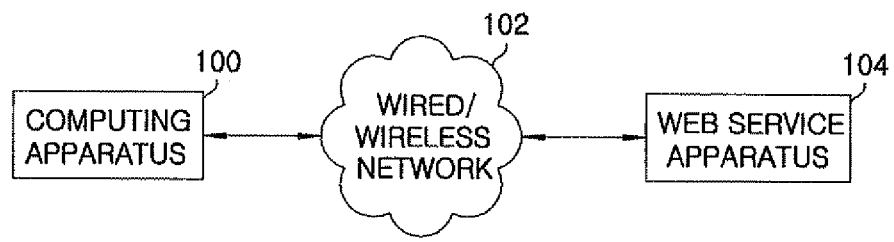
FIG. 1 illustrates a computing apparatus connected to a web service apparatus.

FIG. 1 illustrates a computing apparatus connected to a web service apparatus.

Referring to FIG. 1, a computing apparatus 100 is connected to a web service apparatus 100 via a wired/wireless communication network 102. Here, the computing apparatus 100 and the web service apparatus 104 may form a relationship of a client terminal and a server, and at least one computing apparatus 100 may be connected to at least one web service apparatus 104 via the wired/wireless communication network 102.

The computing apparatus 100 may include any types of electronic devices, such as, for example, a personal computer (PC), a laptop, a portable multimedia player (PMP), a personal digital assistant (PDA), a cellular phone, and a smart phone, which can connect to the wired/wireless communication network 102 and access websites provided by the web service apparatus 104.

When a user executes a browser in the computing apparatus 100 and connects to a website provided by the web service apparatus 104, the web service apparatus 104 provides user-requested web page information to the user's computing apparatus 100.

As used herein, the web page includes, e.g., a dynamic web page, a static web page, and the like. The dynamic web page indicates a web page, such as stock information, weather forecasts, a bulletin board or the like, on which contents can be dynamically registered, modified, and deleted. Such a dynamic web page may be represented in the form of, for example, an active server page (ASP) source, a professional hypertext markup language (HTML) preprocessor (PHP) source, or the like. Unlike the dynamic web page, the static web page indicates a web page on which contents are fixed upon a creation of the web page. For example, the static web page may be represented in the form of an HTML source or the like.

Further, a script may be embedded in the HTML source and may include a linked malicious pattern or malicious script. Thus, when a web page embedded with a malicious script is provided to the user, the malicious script linked to the HTML of the web page concerned is executed in the user's computing apparatus 100.

As a result, the malicious script executes a specific program and process, and performs attacks, such as information leak, file infection, system destruction and the like, by the process executed in the user's computing apparatus 100.

A vulnerability attack code, which is one of malicious scripts executed in the computing apparatus 100, has its ultimate goal to download and execute a malicious program. Although many executable files can be actually downloaded using a browser, the number of actually executed programs is limited. Also, upon executing a normal process, the process has the same stack structure. Thus, with reference to this feature, the computing apparatus 100 checks upon execution of a process whether a certificate is included in the process or whether the stack structure of the process is normal. By checking it, the computing apparatus 100 can determine whether a currently visited website is a malicious website or whether the process currently executed by the computing apparatus 100 is abnormal.

Figure 2:
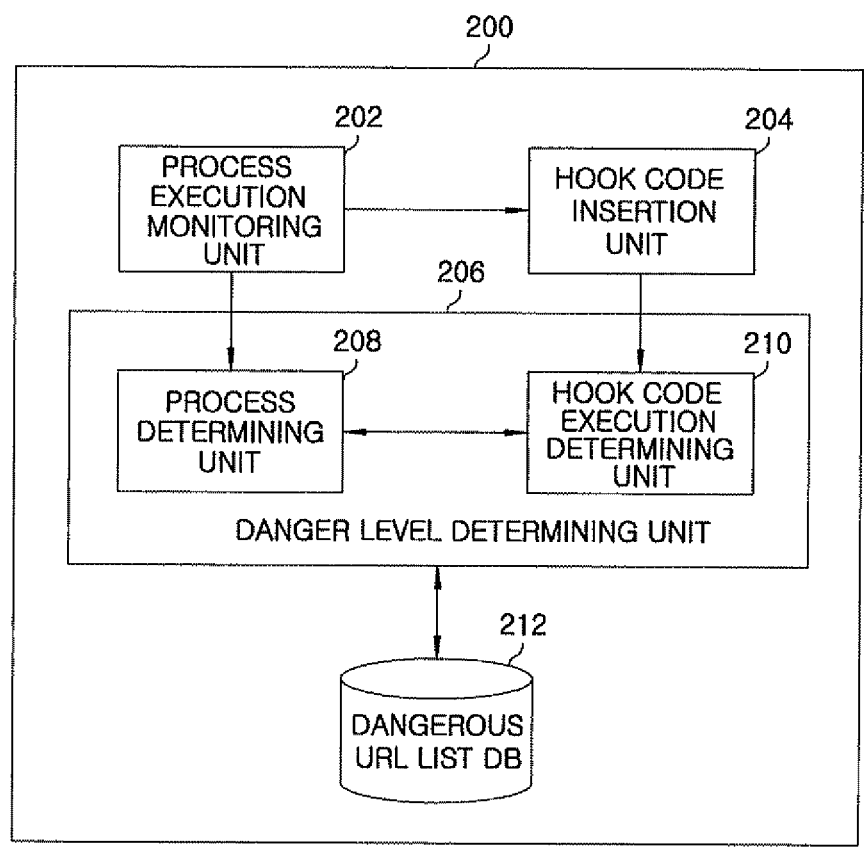
FIG. 2 is a block diagram of an apparatus for detecting malicious sites in accordance with an embodiment of the present invention.

FIG. 2 is a block diagram of an apparatus for detecting malicious sites in accordance with an embodiment of the present invention.

Referring to FIG. 2, a malicious site detecting apparatus 200 may be a stand-alone computing apparatus 100 or an apparatus incorporated in the computing apparatus 100, and includes a process execution monitoring unit 202, a hook code insertion unit 204, a danger level determining unit 206, and a danger URL list DB 212.

Specifically, when the computing apparatus 100 is driven, the process execution monitoring unit 202 periodically monitors processes executed starting from the driving.

As used herein, the term "process" refers to an event in which a program is loaded and executed on a memory. Every program has at least one process when executed, and each process includes a stack containing various commands, counts, a CPU register, routine factors, a return address, parameters, functions, and the like. Processes communicate with each other, each with their own rights and responsibilities. Even if one of the processes running on a system performs an erroneous arithmetic operation to thus cause an error, the other processes may work normally.

The process execution monitoring unit 202 real-time monitors all processes created by accessing a specific website after execution of a browser, as well as executing the browser in the computing apparatus 100. If the process execution monitoring unit 202 detects the execution of the browser showing a web page, e.g., hypertext document, the hook code insertion unit 204 inserts a first hook code at an execution starting point of a process executed by the browser and inserts a second hook code at an execution intermediate point of the process. The inserted hook codes are executed together with the execution of a process created as the user moves to another website later, and inspect the concerned process.

Here, the first hook code is used for determining whether a certificate is included in an executed program, and whether a process has an abnormal stack structure, and the second hook code is used for determining whether an inspection using the first hook code has been done. The execution starting and intermediate points are made at preset locations of the process, and may vary depending on an implementation method. Especially, the execution intermediate point may be anywhere if it is possible to check the completion of an inspection using the first hook code. The danger level determining unit 206 uses the hook code inserted by the hook code insertion unit 204 to determine whether or not a website to which the user has moved is a malicious site. The danger level determining unit 206 includes a process determining unit 208 and a hook code execution determining unit 210.

The process determining unit 208 inspects a process using the first hook code. Upon a website movement of the user, the process determining unit 208 checks whether or not the corresponding program to be executed includes a certificate. In case where a program has been certified by a certificate authority, the program has a certificate therein. Therefore, the process of the corresponding program can be determined as normal by confirming the presence of the certificate concerned upon execution of the program.

Further, if it is determined that the process is normal, a procedure of a stack structure inspection using the first hook code and a first hook code inspection using the second hook code, which will be described later, can be omitted, thereby preventing unnecessary inspection.

In addition, the process determining unit 208 inspects a stack structure of the executed process using the first hook code to determine whether or not the stack structure is abnormal. Because the stack stores pattern information therein, like a kind of inspection engine, the abnormality or normality of the stack structure can be found by checking the start stack and the manufacturers (e.g., Microsoft, Acrobat, etc.) of dynamic link libraries (DLLs) included in the stack. From the following Table 1, it can be seen that the stack structure of a process executed by a malicious code has repetitive DLL files with a specific name.

TABLE 1

Stack structure of a process executed by vulnerability attack (Exploit) code kernel32.dll|SHELL32.dll|OLEAUT32.dll|SHELL32.ll|msadco.dll|vbscript.dll
kernel32.dll|ntdll.dll|kernel32.dll|ntdll.dll
Normal stack structure of a process kernal32.dll|IEShims.dll|AFCSTA~1.OCX|MFC42.DLL|JScript.dll|MFC42.DLL
kernel32.dll|SHELL32.dll|npkcx.ocx|MFC42.DLL|npck.ocx|USER32.dll
kernel32.dll|suipre.dll|aosmgr.ocx|MFC42.DLL|jscript.dll|USER32.dll
kernel32.dll|SHELL32.dll|lssacWebSE2.dll|mshtml.dll|jscript.dll|mshtml.dll Moreover, the process determining unit 208 has information on a specific call stack structure for each process, and therefore, can determine the abnormality or normality of the stack structure of a process. If a stack structure does not match that of the corresponding process, the process determining unit 208 determines that the website address concerned (Uniform Resource Locator, hereinafter referred to as URL) is a dangerous URL as a malicious site. Information of this dangerous URL is stored in a dangerous URL list DB 212 or the computing apparatus 100, or transmitted to, if any, a management server that manages a dangerous URL list on the wired/wireless communication network 102. The program of the website determined as a dangerous URL may be blocked and cured. After inspecting the stack structure, the process determining unit 208 inserts a preset flag indicative of the inspection completion of the stack structure into the corresponding process or stack structure.

Meanwhile, information that a specific process at each website includes a specific call stack structure is applicable to a client for a monitoring service or a client-server model. That is, the client for the monitoring service can have the information in the form of an engine and periodically check it. Meanwhile, the client-server check whether or not other information than the call stack structure of a specific process that has been previously reported within a specific website is collected from a client.

The hook code execution determining unit 210 inspects whether or not the first hook code is executed through the use of the second hook code. The execution of the first hook code can be found by confirming the presence of the preset flag because the process determining unit 208 inserts the preset flag into the corresponding process or stack structure after inspecting the stack structure of the process by the first hook code. If the preset flag exists, this indicates that the first hook code has been executed to thus complete the inspection. Therefore, the corresponding website can be determined as normal.

However, if the preset flag does not exist, there is a probability that the first hook code might have been substituted, changed, or deleted by a malicious code. In this case, the corresponding URL of the website may be determined as a dangerous URL, so that it is stored in the dangerous URL list DB 212 or transmitted to the management server.

Meanwhile, the danger level determining unit 206 determines whether or not both of the stack structure inspection and flag inspection using the first and second hook codes have been done by using a function such as EnumProcess. If both of the two inspections have been done, the corresponding process can be determined as a normal process, whereas, if at least one of the two inspections has not been done, the URL of the website of which the corresponding process has been executed is determined as a dangerous URL.

Figure 3:
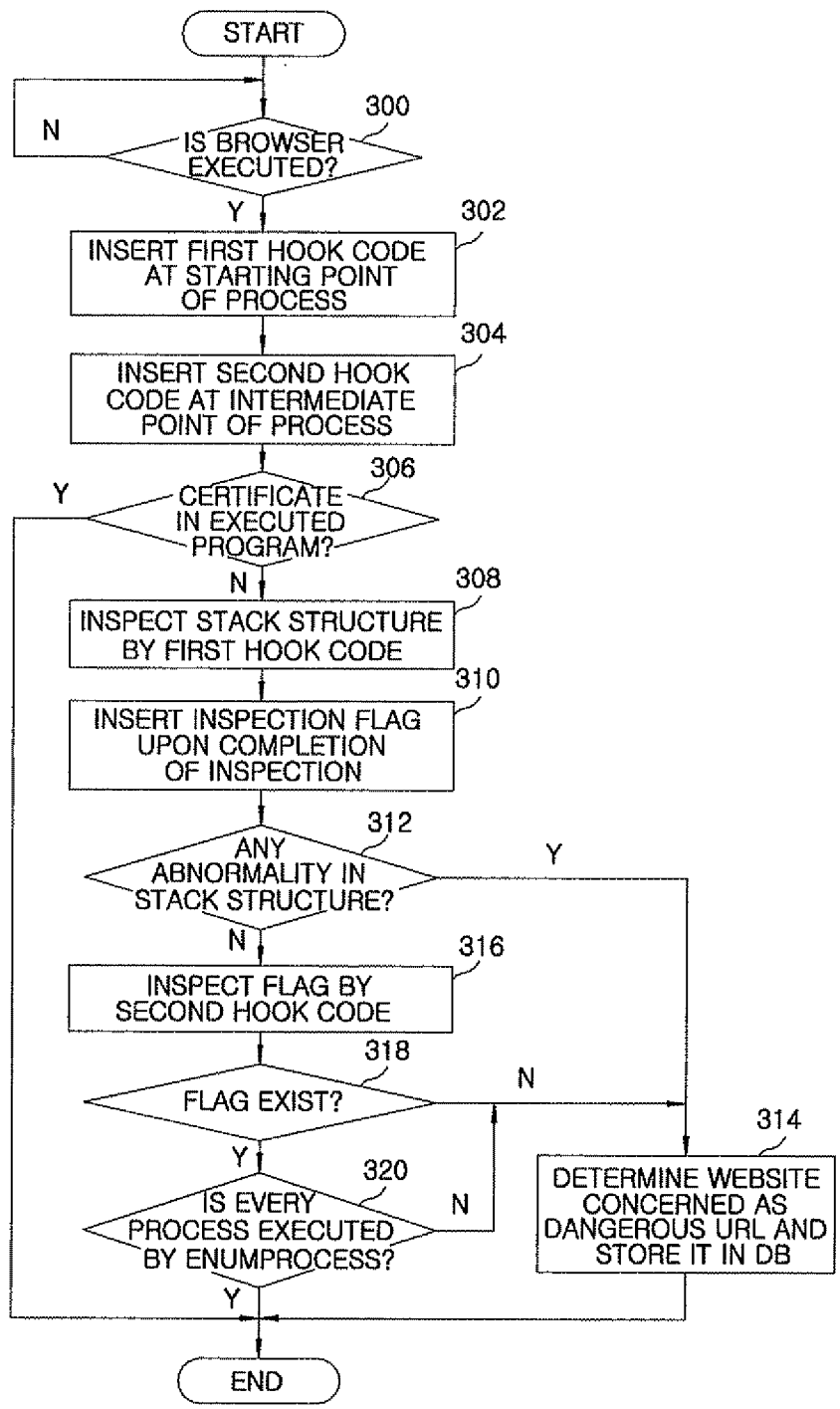
FIG. 3 is a flowchart illustrating an operating procedure of an apparatus for detecting malicious sites in accordance with an embodiment of the present invention.

FIG. 3 is a flowchart showing an operating procedure of an apparatus for detecting malicious sites in accordance with an embodiment of the present invention.

Referring to FIG. 3, upon execution of the computing apparatus 100, the process execution monitoring unit 202 in the malicious site detecting apparatus 200 periodically checks the processes to be executed. In step 300, when the process execution monitoring unit 202 detects the execution of a browser by the user, the hook code insertion unit 204 inserts a first hook code at the execution starting point of a process executed by the browser in step 302 and inserts a second hook code at the execution intermediate point of the process in step 304.

Upon detection of a user's website movement, the process determining unit 208 in the danger level determining unit 206 inspects a process executed by the website movement using the first hook code. First, in step 306, it is determined whether or not a certificate exists in a program. If the certificate exists, this means that the process is a normal process and therefore the malicious site detection procedure is finished. If, however, no certificate exists in the program, the stack structure of the process is inspected by the first hook code to determine the abnormality or normality the process in step 308. The process determining unit 208 stores information enabling it to check the start stack and manufacturers of DLL files included in the stack for comparison with a normal stack structure of the process and information of a specific process of each site and a specific call stack structure. Therefore, in step 310, the process determining unit 208 performs the stack structure inspection and then inserts a flag indicative of the inspection completion into the corresponding process or stack structure.

Thereafter, if there is any abnormality in the inspected stack structure in step 312, the flow proceeds to step 314 in which the website to which the user has moved is determined as a malicious site, and the URL of the website is classified as a dangerous URL, and stored in the dangerous URL list DB 212 or transmitted to the management server.

However, if there is no abnormality in the inspected stack structure in step 312, or no inspection is done, the flow proceeds to step 316 in which the hook code execution determining unit 210 performs a flag inspection using the second hook code. The flag inspection is for determining whether or not the inspection using the first hook code has been done. If no preset flag exists, it can be determined that the first hook code has been substituted, changed, or deleted by a malicious code.

Thus, if it is determined that no preset flag exists in step 318, the flow proceeds to step 314 in which the website is determined as a malicious site and classified as a dangerous URL and stored in the dangerous URL list DB 212 or transmitted to the management server.

However, if it is determined that a preset flag exists in step 318, the flow proceeds to step 320. In step 320, when it is checked that there is a process being executed periodically by the browser through the use of an EnumProcess function, it is determined whether or not both of the two inspections using the first and second hook codes have been done with respect to the process. If it is determined that both of the two inspections have been done, the corresponding process is determined as a normal process and the flow is finished. However, if any one of the two inspections has not been done, the flow returns to step 314 in which the corresponding website is classified as a dangerous URL and stored in the dangerous URL list dB 212 or transmitted to the management server.

As described above, the apparatus and method for detecting malicious sites in accordance with the embodiment of the present invention can determine the presence or absence of a malicious site by focusing on the differences between process execution of a program downloaded from a specific website and a normal process, execution. Accordingly, it is possible to determine whether the current website is malicious site or whether a process currently executed by a computer is abnormal by checking the presence or absence of a certificate in the program or the normality or abnormality of a stack structure at the time point of execution of the process.

The embodiments in accordance with the present invention may include a computer-readable medium that stores computer-executable instructions or data structures. The computer-readable medium may be any medium that can be controllable by a computer that executes a general function or special function. Examples of the computer-readable medium include a random access memory (RAM), a read only memory (ROM), an electrically erasable programmable read only memory (EEPROM), a compact disk-ROM (CD-ROM) and optic disk, a magnetic disk and magnetic storage device, and the like. Further, the computer-readable medium may also include any medium that can store a program code in the form of computer-executable instructions or data structures, in addition to the foregoing medium.

While the invention has been shown and described with respect to the particular embodiments, it will be understood by those skilled in the art that various changes and modification may be made without departing from the scope of the invention defined in the following claims.

What is claimed is:

1. An apparatus for detecting malicious sites, the apparatus comprising:
   a monitoring unit configured to monitor all processes executed in a computing apparatus;
   a database for storing the website determined to be malicious in a malicious site list;
   a hook code insertion unit configured to insert a first hook code at an execution starting point of a process executed by a browser and insert a second hook code at an execution intermediate point of the process executed by the browser;
   and a danger level determining unit that, upon detection of a website movement, inspects a stack structure of a process created by the website movement using the hook code, checks whether or not the stack structure inspection has been done, and determines whether or not the website to which the movement has been made is a malicious site,
   wherein the danger level determining unit comprises:
   a process determining unit configured to perform the inspection of the stack structure of the process created according to the website movement by using the first hook code;
   and a hook code execution determining unit configured to check whether or not the stack structure inspection using the first hook code has been performed by using the second hook code;
   check whether or not a certificate exists in a program of the process created according to the website movement by using the first hook code,
   and if there is no certificate in the program, perform an inspection of the stack structure based on information of the manufacturers of dynamic link library (DLL) files included in the stack of a specific process and information of a unique process of each website and a unique call stack structure in the unique process.

2. The apparatus of claim 1, wherein the danger level determining unit is configured to:
   insert, after completion of the inspection of the stack structure, an inspection complete flag into the corresponding process; and
   if the stack structure is determined as abnormal from a result of the stack structure inspection, determine the moved website as a malicious site.

3. The apparatus of claim 2, wherein the hook code execution determining unit is configured to:
   inspect the presence or absence of the inspection complete flag by using the second hook code; and
   if the inspection complete flag does not exist, determine the moved website as a malicious site.

4. The apparatus of claim 1, wherein the hook code execution determining unit is configured to:
   check whether or not the two inspections using the first hook code and the second hook code have been completed by using a preset process function; and
   if any one of the two inspections has not been done, determine the moved website as a malicious site.

5. A method for detecting malicious sites, the method comprising:
   upon detection of execution of a browser execution in a computing apparatus by a monitoring unit while monitoring all processes executed in the computing apparatus, inserting a first hook code at an execution starting point of a process executed by the browser; and inserting a second hook code at an execution intermediate point of the process executed by the browser;
   upon detection of a website movement by the monitoring unit, inspecting a stack structure of a process created according to the website movement by using the hook code;
   checking, by a danger level determining unit, whether or not the stack structure inspection has been made, and determining whether or not the website to which the movement has been made is a malicious site;
   and storing the website determined as the malicious site in a database,
   and wherein said determining whether or not the website to which the movement has been made is a malicious site includes:
   performing the inspection of the stack structure by using the first hook code;
   and checking whether or not the stack structure inspection using the first hook code has been performed by using the second hook code;
   checking whether or not a certificate exists in a program of the process created according to the website movement prior to performing the stack structure inspection;
   and if there is no certificate in the program, performing an inspection of the stack structure based on information of the manufacturers of dynamic link library (DLL) files included in the stack of a specific process and information of a unique process of each website and a unique call stack structure in the unique process.

6. The method of claim 5, wherein said determining whether or not the website to which the movement has been made is a malicious site further comprises:
- after completion of the inspection of the stack structure, inserting an inspection complete flag into the corresponding process; and
- if the stack structure is determined as abnormal from a result of the stack structure inspection, determining the moved website as a malicious site.

7. The method of claim 6, wherein said determining whether or not the website to which the movement has been made is a malicious site further comprises:
- inspecting the presence or absence of the inspection complete flag by using the second hook code; and
- if the inspection complete flag does not exist, determining the moved website as a malicious site.

8. The method of claim 5, wherein said determining whether or not the website to which the movement has been made is a malicious site further comprises:
- checking whether or not the two inspections using the first hook code and the second hook code have been completed by using a preset process function; and
- if any one of the two inspections has not been done, determining the moved website as a malicious site.

9. A non-transitory computer-readable storage medium including computer executable instructions, wherein the instructions, when executed by a processor, cause the processor to perform the method of claim 5.

* * * * *